3,103,998
FREEWHEEL DEVICES

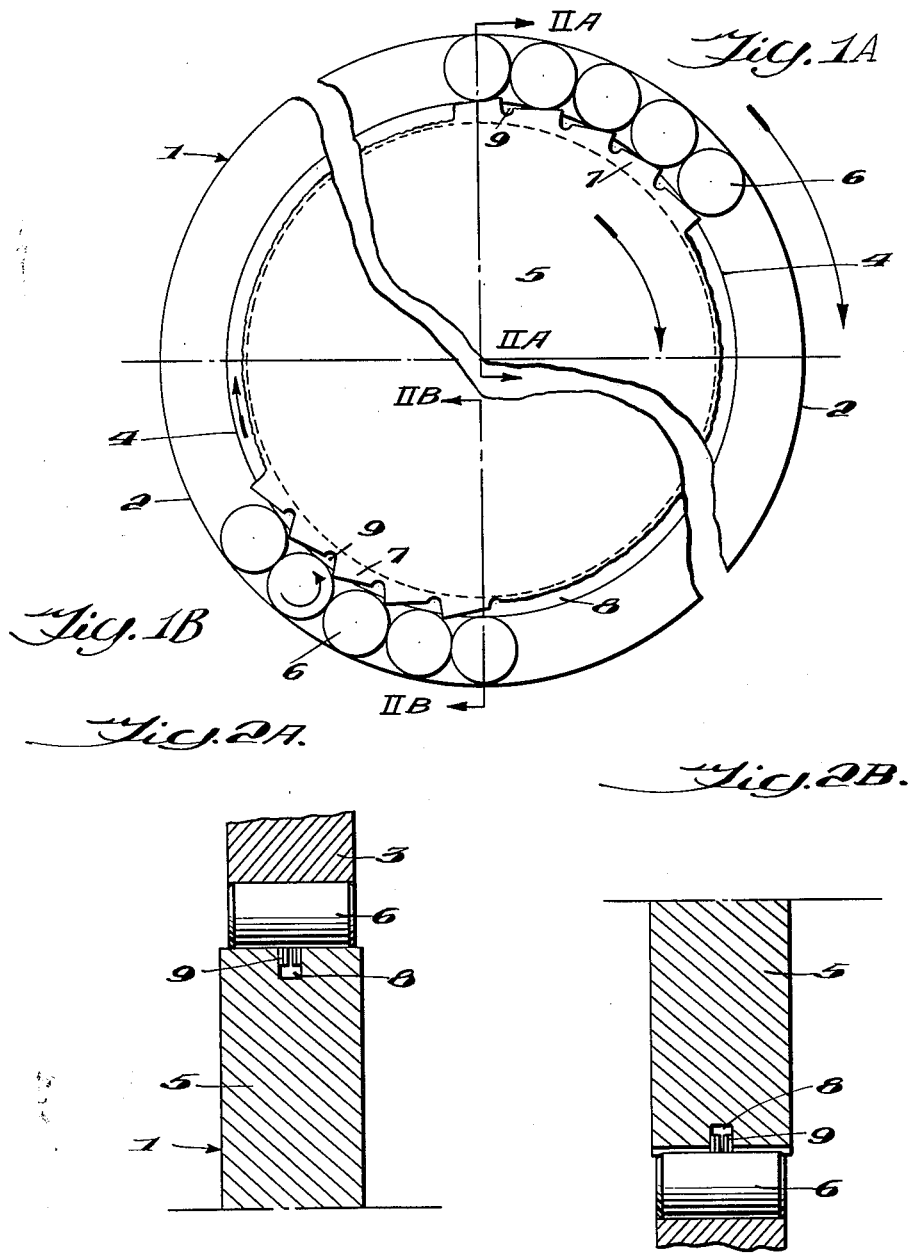

Kenneth Watson, Woolston, Southampton, England, assignor to Westland Aircraft Limited, Yeovil, Somerset, England
Filed Nov. 25, 1960, Ser. No. 71,500
Claims priority, application Great Britain Dec. 4, 1959
1 Claim. (Cl. 192—45)

This invention relates to an improved freewheel device which may be used to provide an overdrive between an engine and its associated gearing.

In the past freewheel devices have been of bulky construction with corresponding complicated mechanism and weight penalties. Certain types of freewheel devices have been known to comprise an outer driven race housing a cage carrying ball or roller bearings and an inner race having portions of wedge shaped configuration in communication with said balls/rollers and attached to the shaft or mechanism to be driven. With the device in the driving position the balls/rollers move up the wedge to lock the two races together. In the overdrive or freewheel position the balls/rollers are constrained to move down the wedge allowing the inner race to rotate independently of the outer race. The main disadvantage of this method is that a certain amount of rubbing takes place in view of the fact that the balls/rollers are prevented by the cage from rotating freely. This eventually causes wear of the inner and outer races and may cause the cage to break up. Further, such devices are often from the necessary design requirements larger than the application warrants.

It is with the above problem in mind that the following invention has been evolved.

It is an object of the invention, therefore, to provide a small compact freewheel device of simple construction which may be used to provide an overdrive between a driven member and a driving member.

It is a further object of the invention to provide a freewheel device which eliminates the need for a cage and substantially reduces rubbing and the subsequent wear of the races.

It is a further object of the invention to provide a freewheel device according to the preceding paragraph wherein the absence of said cage permits an increase in the number of balls/rollers which may comprise the device had the cage been present; therefore a smaller freewheel device capable of taking an equivalent load may be provided without a cage, incorporating the same number of rollers as would be required for a larger device without the cage incorporated therein.

It is a further object of the invention to provide a freewheel device according to the preceding paragraph wherein substantially 30% more rollers can be used for a corresponding increase in centrifugal force.

The invention consists in a freewheel device comprising an outer race, an inner race of wedge shaped configuration, rollers disposed between said outer and inner races, said rollers constrained at all times to be urged against the outer race by way of spring means.

The invention also consists in a freewheel device according to the preceding paragraph wherein said outer race provides a smooth bearing surface or track for said rollers.

The invention also consists in a freewheel device according to the second preceding paragraph wherein said inner race of wedged shaped configuration comprises peripherally disposed inclined portions corresponding to each individual roller.

The invention also consists in a freewheel device according to the third preceding paragraph wherein said spring means comprise a readily extendable piston ring type spring circumferentially adapted to urge said rollers against said outer race at all times.

The invention also consists in a freewheel device according to the fourth preceding paragraph wherein said spring means is disposed in a groove provided circumferentially and substantially centrally in said inner race.

The invention also consists in a freewheel device according to the third preceding paragraph wherein upon said outer race being attached to a driving member and said inner race being attached to a member to be driven, when the device is used in the driving position, the spring means urges the rollers up the wedge shaped portions consequently locking the inner and outer races together and thus providing a direct drive between the driving member and the driven member.

The invention also consists in a freewheel device according to the fourth preceding paragraph wherein upon said outer race being attached to a driving member and said inner race being attached to a member to be driven, the device when used in the overdrive position the rollers are constrained to move down the wedge shaped portions allowing the inner race to rotate independently of the outer race, by way of compression of said spring means.

The invention also consists in a freewheel device of the type specified comprising an inner race attached to a driving member and an outer race attached to the member to be driven, said wedge shaped configurations provided on said outer race and said spring means provided circumferentially and substantially centrally in said outer race, to urge rollers against said inner race.

The invention also consists in a freewheel device according to the second preceding paragraph wherein upon the device being used in the overdrive position said rollers remain in contact with the two races, individually rotating relative to each other depending upon the relative speed of rotation of said races.

The invention further consists in a freewheel device as hereinafter described and as shown in the accompanying drawings wherein:

FIGURE 1A is a diagrammatic longitudinal section through the freewheel device in the engaged position.

FIGURE 1B is a diagrammatic longitudinal section through the freewheel device in the disengaged or freewheel position.

FIGURE 2A is a diagrammatic transverse section IIA—IIA of the freewheel device as shown in FIGURE 1A.

FIGURE 2B is a diagrammatic transverse section IIB—IIB of the freewheel device as shown in FIGURE 1B.

In carrying the invention into effect according to one convenient form by way of example only, referring to the drawings (FIGURE 1A and FIGURE 2A) we provide a freewheel device generally indicated at 1 comprising an outer race 2 which is attached to a driving member 3 and an inner race 4 attached to a driven member 5 and held in spaced relationship to said outer race 2 by way of a plurality of rollers 6. The outer race 2 provides a smooth bearing surface or track adapted to the contour of said rollers 6 and the inner race 4, which is of circular configuration having a series of peripherally disposed inclined portions 7 adjacent to and corresponding to each individual roller 6. A groove 8 substantially centrally and circumferentially disposed around the inner race 4 houses a spring or springs 9. The spring or springs 9 are of the readily extendable piston ring type, made of a convenient material and adapted to expand and so urge said rollers 6 against said outer race 2 at all times.

In operation of the invention it will be seen from FIGURES 1A and 2A that if the driving member 3, which is connected to the outer race 2, is rotating in a clockwise direction, the rollers 6 which are urged against the outer race 2 by the srings 9 are adapted to ride up the inclined planes 7 of the inner race 4 until clockwise movement of said rollers is prevented by lack of clearance between said outer race 2 and said inner race 4, in consequence, said outer race becomes locked by the rollers 6 to said inner race 4. The outer race 2 and the inner race 4 which is connected to a driven member 5 then forms a fixed drive and the freewheel device 1 can then be said to be in the "engaged" or "drive" position.

Conversely, it will be seen from FIGURES 1B and 2B that if the driving member 3 is stopped but the driven member 5 continues to rotate in the clockwise direction, the inner race 4 being connected to driven member 5 will also continue to rotate in a clockwise direction and the rollers 6 will be constrained to retreat down the inclined plane 7 of the inner race 4 until said rollers are positioned at the base of said inclined plane, but still remain in contact with the springs 9 and the outer race 2. The freewheel device can then be said to be in the freewheel or overdrive position in which the working clearances give the rollers 6 freedom of movement within the outer and inner races, and allow said inner race 4 to rotate independently of said outer race 2. At the same time said rollers 6 will be caused to rotate individually in an anti-clockwise direction by frictional contact with springs 9 and also to track between said stationary outer race 2 and said moving inner race 4 in a clockwise direction. By this arrangement rubbing of the rollers when over-riding or free-wheeling is substantially reduced with a corresponding reduction in the wear of the races.

It will also be readily apparent from the drawings to those skilled in the art that, numerous refinements and modifications may be carried out without departing from the scope of the invention in that the outer and inner races could be reversed so that the inner driven member could become the driving member and the outer driving member the driven member if so desired.

I claim as my invention:

A cageless freewheel device of the type specified, comprising an outer race, an inner race having a plurality of portions of wedge shaped configuration provided around the periphery thereof, a plurality of rollers disposed between said outer race and said inner race, corresponding in number to said plurality of portions, wherein said inner race is provided with a circumferentially and centrally disposed groove housing spring means, and wherein said spring means is free to rotate within said groove and provides a friction contact to rotate said rollers individually when the device is in the freewheel condition, thereby substantially reducing rubbing of said rollers and therefore the rate of wear in said device.

References Cited in the file of this patent

FOREIGN PATENTS

| | | |
|---|---|---|
| 316,947 | Great Britain | Dec. 8, 1930 |
| 918,339 | France | Oct. 21, 1946 |
| 966,553 | Germany | Aug. 22, 1957 |
| 1,154,767 | France | Nov. 12, 1957 |
| 1,162,705 | France | Apr. 14, 1958 |